(No Model.)
C. W. BARNABY.
SHAFT COUPLING.
No. 481,092. Patented Aug. 16, 1892.
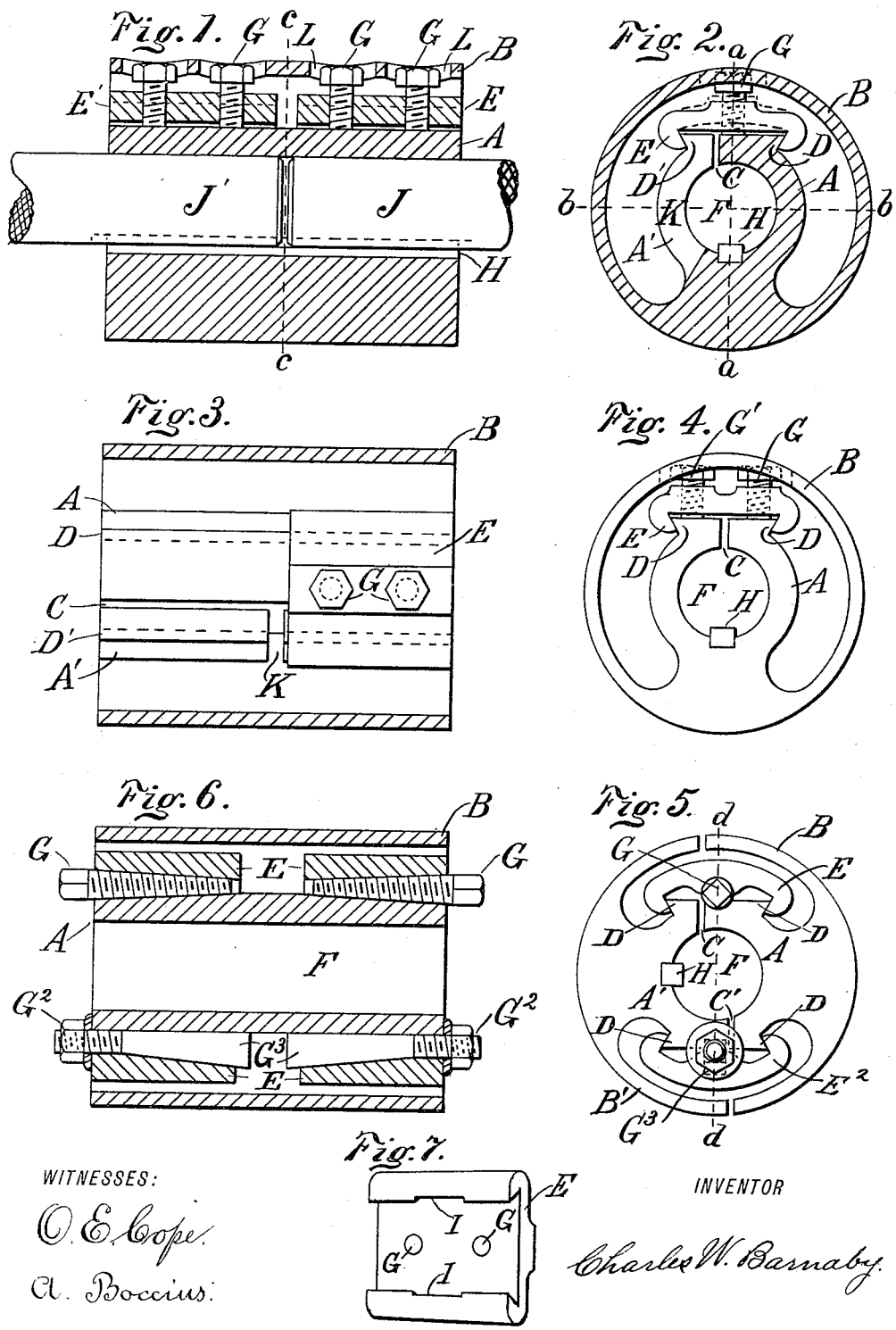
WITNESSES:
O. E. Cope
A. Boccius
INVENTOR
Charles W. Barnaby

UNITED STATES PATENT OFFICE.

CHARLES W. BARNABY, OF ST. LOUIS, MISSOURI.

SHAFT-COUPLING.

SPECIFICATION forming part of Letters Patent No. 481,092, dated August 16, 1892.

Application filed January 4, 1890. Serial No. 335,933. (No model.)

*To all whom it may concern:*

Be it known that I, CHARLES W. BARNABY, a citizen of the United States, residing in the city of St. Louis and State of Missouri, have invented a new and useful Shaft-Coupling, of which the following is a specification.

My invention relates to improvements in that class of shaft-couplings which are employed to secure by a clamping action the adjoining ends of two sections of shafting to form a continuous shaft, and the objects of my invention are, first, to simplify and cheapen the construction of such couplings without impairing the uniformity of the clamping action throughout the length of the coupling, and, second, to facilitate the operation of securing the shafts in and releasing them from the coupling.

My invention consists in the application to a coupling divided longitudinally on one or more sides of a clamping device which spans across the dividing opening or slot and engages with flanges on each side of the same in such a manner as to tend to force the flanges together when the clamping device is forced, by the application of screws or other devices, in a radial direction from the shaft. To give an even contour to the outside of the coupling, I prefer to inclose the clamping device by a cylindrical rim concentric with the shaft provided with suitable openings at the ends, and in the face to insert and operate the clamping-block and screws; but this cylindrical rim is not essential to the application of my invention.

In the accompanying drawings, Figure 1 is a longitudinal section on the line *a a*, Fig. 2, of a coupling embodying my improvement, showing the adjoining ends of the shafts which it secures. Fig. 2 is a cross-section on line *c c*, Fig. 1; Fig. 3, a longitudinal section of the rim on the line *b b*, Fig. 2, and a plan view of the clamping part of the coupling, the clamping-block being removed from the left-hand end to show the dividing-slot and clamp-flanges. Figs. 4 and 5 are end views, and Fig. 6 a longitudinal section on the line *d d*, Fig. 5, all showing modifications in the application of my invention. Fig. 7 is a perspective view of the clamping-block of Figs. 1, 2, and 3.

Similar letters refer to similar parts throughout the several views.

The clamping-sleeve A, with its longitudinal flanges D D' and the connected rim B, form the body of the coupling. The clamping-blocks E are preferably dovetailed onto the flanges D D', engaging with their outer faces, which diverge as they recede from the shaft, so that when the clamping-blocks E are forced in a radial direction from the center of the shaft the flanges D D' are forced toward each other, thus closing the shaft-hole F and securely clamping the inserted ends of properly-fitted shafts. The torsional stress on shafting being much greater in ordinary practice than the longitudinal strain it is preferable to employ a key H to assist the coupling in overcoming this torsional stress, so that it may not be necessary to clamp the shaft with a force so greatly in excess of that required to resist the longitudinal strain.

For ordinary purposes I prefer to apply my invention substantially as represented in Figs. 1, 2, 3, and 7, using one clamping-screw G in each end of each clamping-block E E', the angle or dovetailed surfaces of the clamping-blocks being cut away slightly in the center, as at I, Fig. 7, to insure the clamping-surfaces coming into action at the ends of the clamping-blocks. The slot C is preferably placed at one side of the center, as shown in Figs. 2 and 3, to give a solid bearing for the ends of the clamping-screws G and also to give greater strength to that side A of the clamping-sleeve which is continuous throughout the length of the coupling, the other side A' being preferably divided in the middle by a transverse slot K, Figs. 2 and 3, to admit of a more ready conformity to slight deviations in the diameters of the two ends of the shafts J J'. When thus constructed, the accuracy of the fit or finish of the dovetailed contact-surfaces of the clamping-block and flanges is of little moment, for, if the clamping-block fits looser at one of its ends than the other upon the dovetailed surfaces of the clamping-flanges, that end will merely be forced somewhat farther from the shaft when the screws G, Figs. 1, 2, and 3, are operated to clamp the inserted end of the shaft. This enables me to use unfinished cast surfaces for my clamping device and at the same time secure greater certainty in the uniform firmness with which the shafts are clamped throughout the length of the coupling than is obtained with most forms of clamping-devices now in the market when fitted up with great accuracy at considerable expense. I find it practicable in ordinary cases to give the dovetailed clamping-faces a sufficiently-great angle to cause them to release their hold as soon as the screws G are backed out to loosen the clamp. This greatly facilitates the operation of uncoupling the shafts when required. The clamping action of the clamping-block E, as shown in the figures, is due partly to the wedge-like action of the dovetailed clamping-surfaces and partly to the bending of the clamping-block under the stress thrown upon it by the screws G, which tend to bend it to the shape indicated by the dotted lines, Fig. 2. This bending obviously draws the dovetailed sides of the block closer together and adds to the efficiency of the clamping action. It is evident that in the application of my invention more or less of either of these two clamping actions may be utilized, according to the desire of the designer or the requirements of any particular case. By making the clamping-block very massive the clamping action will be confined almost wholly to the wedge action, while by making the clamping-block somewhat flexible and giving the engaging surfaces with the flanges D D' such shape that there is no wedge action, the clamping action may be confined entirely to the shortening due to the bending. When it is desirable, on account of the dividing-slot C being in the center or for other reasons, the tightening-screws G G' may be placed at the sides of the clamping-block, as indicated in Fig. 4. The clamping-blocks may also be forced radially from the shaft by the action of tapered screws or wedges, as indicated in Figs. 5 and 6, at G and $G^3$, threaded nuts $G^2$ being provided to draw the wedges.

When desired a greater or less number of clamping-blocks than shown may be applied to each coupling and each clamping-block may be operated by one or more screws or wedges.

My invention may be applied to clamp the several parts of a coupling together when it is found desirable to split it longitudinally into two or more sections, as indicated in Fig. 5.

Each of the several modified forms of clamping-blocks represented are applicable to the several forms of couplings shown and described, as are also other modifications within the scope of my invention.

I claim as my invention and desire to secure by Letters Patent—

1. The combination, in a shaft-coupling, of a longitudinally-divided clamping-sleeve provided with a flange on each side of the dividing-slot and one or more clamping-blocks dovetailed onto said flanges, each block provided with one or more screws, by which the clamping-blocks may be forced radially from the center of the coupling to close the clamping sleeve upon the shafts, substantially as set forth.

2. The combination, in a shaft-coupling, of a clamping-sleeve divided longitudinally by one or more slots and provided with a flange on each side of each slot, and a clamping-block dovetailed or hooked over each pair of flanges, and device for operating said block so that the flanges will be forced toward each other when the clamping-block is forced or sprung radially from the center of the coupling, substantially as set forth.

CHAS. W. BARNABY.

Witnesses:
GEO. A. HYNES,
ALBERT T. TERRY.